(12) United States Patent
Kim et al.

(10) Patent No.: US 10,865,544 B2
(45) Date of Patent: Dec. 15, 2020

(54) TRAVEL CONTROL SYSTEM FOR CONSTRUCTION MACHINERY AND TRAVEL CONTROL METHOD FOR CONSTRUCTION MACHINERY

(71) Applicant: DOOSAN INFRACORE CO., LTD., Incheon (KR)

(72) Inventors: Kiyong Kim, Seoul (KR); Changmook Kim, Incheon (KR); Youngmin Seo, Seoul (KR); Taeseob Jeong, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 16/665,204

(22) Filed: Oct. 28, 2019

(65) Prior Publication Data

US 2020/0131735 A1    Apr. 30, 2020

(30) Foreign Application Priority Data

Oct. 29, 2018 (KR) .................. 10-2018-0129685

(51) Int. Cl.
*E02F 9/22* (2006.01)
*F15B 15/18* (2006.01)
*F15B 15/20* (2006.01)

(52) U.S. Cl.
CPC .......... *E02F 9/2225* (2013.01); *E02F 9/2267* (2013.01); *E02F 9/2271* (2013.01);
(Continued)

(58) Field of Classification Search
CPC ..... E02F 9/2292; E02F 9/2285; E02F 9/2225; E02F 9/2242; E02F 9/2296; F15B 15/18; F15B 15/202
See application file for complete search history.

(56) References Cited

U.S. PATENT DOCUMENTS 6,708,490 B2 * 3/2004 Toji .................. E02F 9/2239
                                                    60/421
7,614,225 B2   11/2009 Kim
(Continued)

FOREIGN PATENT DOCUMENTS

| EP | 3216927 A1 | 9/2017 |
| EP | 3305994 A2 | 4/2018 |
| EP | 3305994 A3 | 6/2018 |

OTHER PUBLICATIONS

Extended European Search Report dated Mar. 17, 2020 in connection with the counterpart European Patent Application No. EP19205561.4.

*Primary Examiner* — Abiy Teka
(74) *Attorney, Agent, or Firm* — Hauptman Ham, LLP

(57) ABSTRACT

A travel control system for construction machinery includes first and second hydraulic pumps, a first travel motor and a second travel motor operable by a working oil discharged from the first hydraulic pump or the second hydraulic pump, at least one actuator operable by the working oil discharged from the first hydraulic pump or the second hydraulic pump, a straight travel valve to be switched between a first position and a second position, first and second travel motor control valves configured to control amounts of the working oil supplied to the first and second travel motors, first and second spool displacement adjusting valves supplying pilot signal pressures to the spools of the first and second travel motor control valves respectively, and a controller configured to output a control signal to each of the first and second spool displacement adjusting valves corresponding to a manipulation signal of an operator.

11 Claims, 8 Drawing Sheets

(52) U.S. Cl.
CPC .......... *E02F 9/2285* (2013.01); *E02F 9/2292* (2013.01); *F15B 15/18* (2013.01); *F15B 15/202* (2013.01)

(56) References Cited

U.S. PATENT DOCUMENTS

2007/0044464 A1  3/2007  Verkuilen
2018/0094406 A1* 4/2018  Kim .................... E02F 9/2271

* cited by examiner

FIG. 6
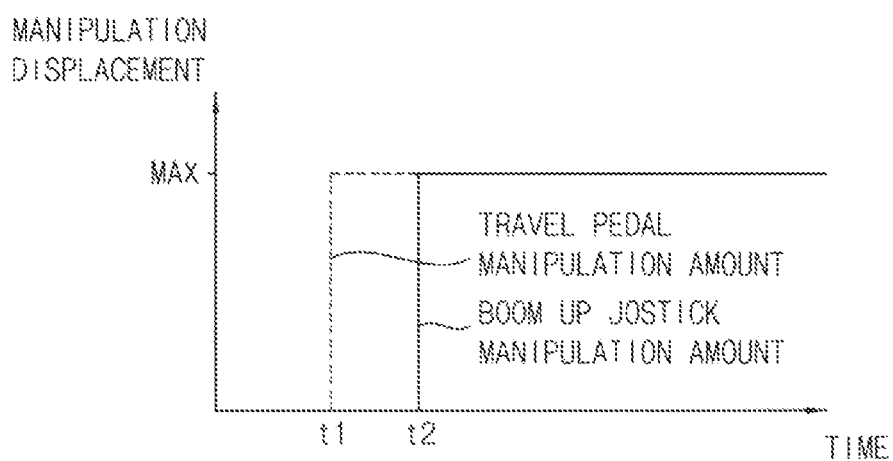
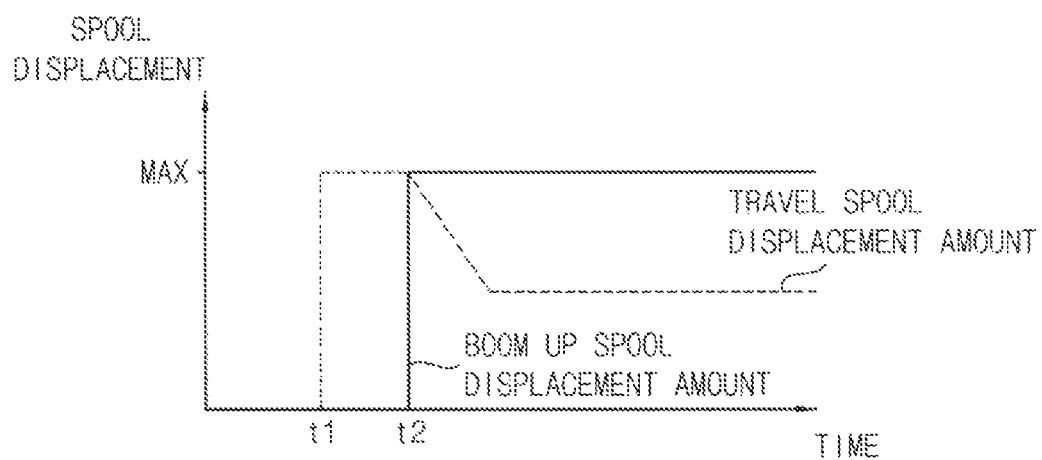

FIG. 7
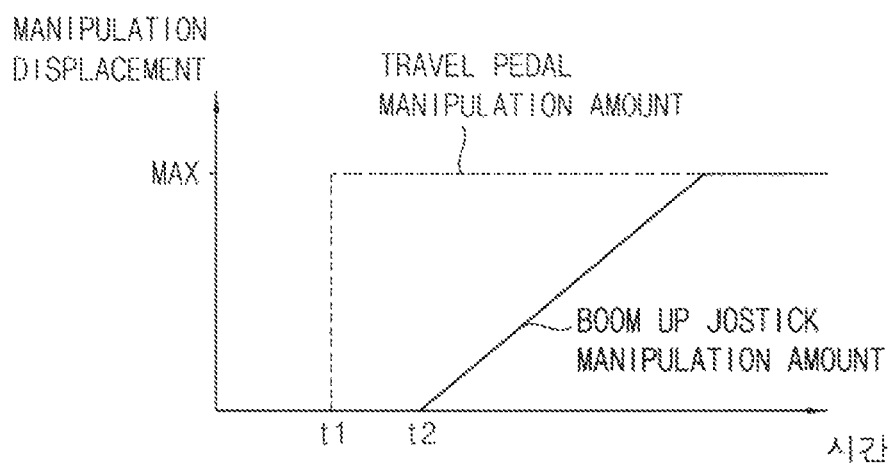
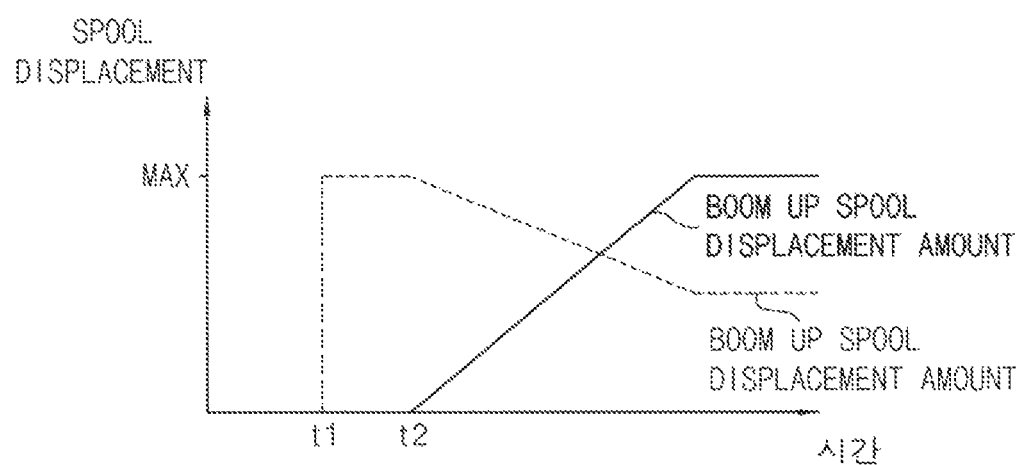

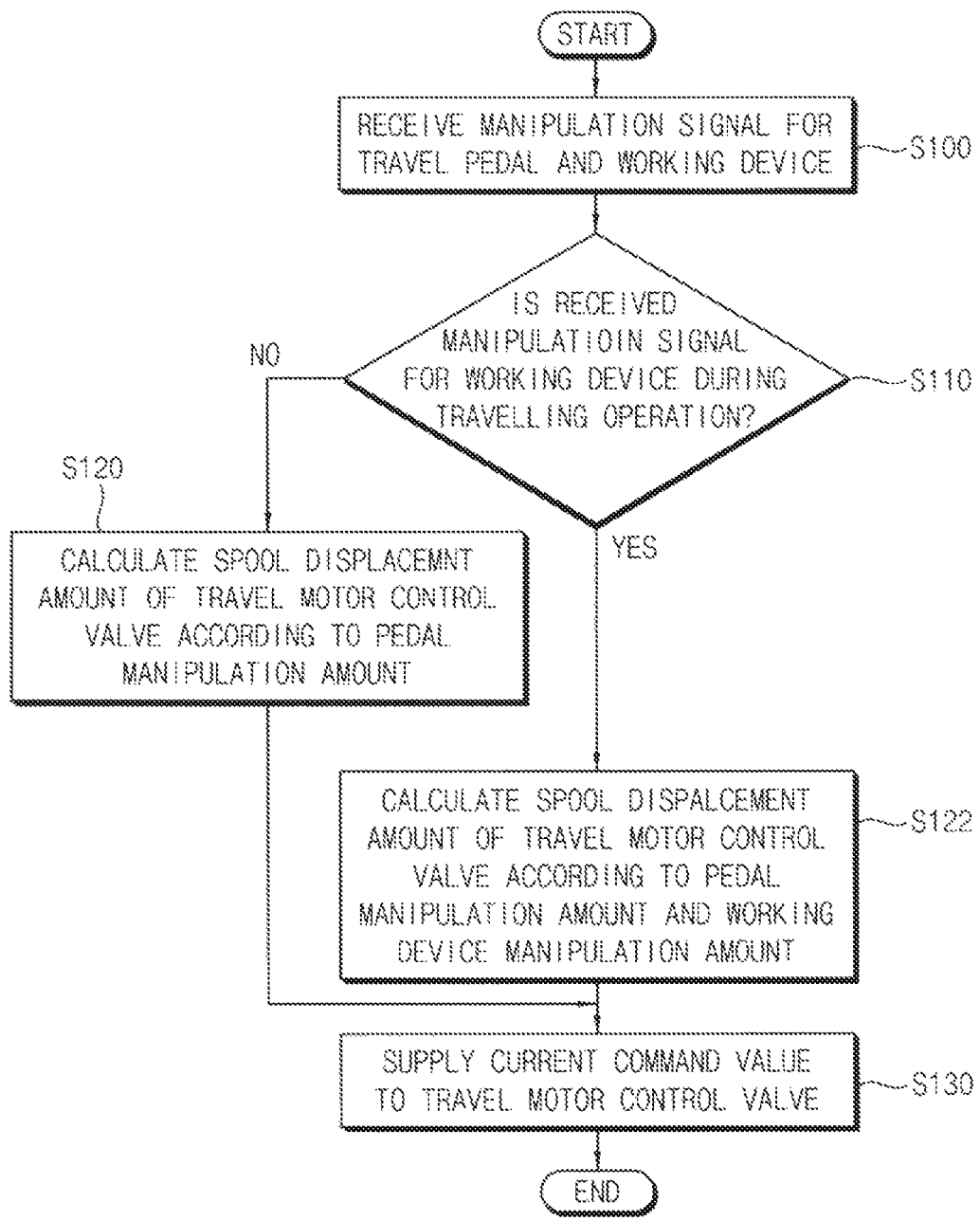

TRAVEL CONTROL SYSTEM FOR CONSTRUCTION MACHINERY AND TRAVEL CONTROL METHOD FOR CONSTRUCTION MACHINERY

PRIORITY STATEMENT

This application claims priority under 35 U.S.C. § 119 to Korean Patent Application No. 10-2018-0129685, filed on Oct. 29, 2018 in the Korean Intellectual Property Office (KIPO), the contents of which are herein incorporated by reference in their entirety.

BACKGROUND

1. Field

Example embodiments relate to a travel control system for construction machinery and a travel control method for construction machinery. More particularly, example embodiments relate to a travel control system for construction machinery including an electro-hydraulic main control valve using an electro proportional pressure reducing valve.

2. Description of the Related Art

Recently, in an electronic control in construction machinery, an electro-hydraulic main control valve with an electro proportional pressure reducing valve (EPPRV) may be used. Also, the construction machinery may include a left travel motor and a left travel motor. Accordingly, the construction machinery may travel and implement various working operations. In this case, a straight travel valve may be switched between the travelling operation and the working operation.

However, a switching impact may occur when the straight travel is switched. In case of designing the travelling operation preferentially, the working operation such as a boom-up operation may slow down or an operation performance may be deteriorated, while in the case of designing the working operation preferentially, pressure loss may occur during the travelling operation thereby deteriorating fuel efficiency.

SUMMARY

Example embodiments provide a travel control system for construction machinery capable of reducing a switching impact of a straight travel valve and improving fuel efficiency and work efficiency.

Example embodiments provide a travel control method for construction machinery using the above travel control system.

According to example embodiments, a travel control system for construction machinery includes first and second hydraulic pumps, a first travel motor operable by a working oil discharged from the first hydraulic pump, a second travel motor operable by the working oil discharged from the first hydraulic pump or the second hydraulic pump, at least one actuator operable by the working oil discharged from the first hydraulic pump or the second hydraulic pump, a straight travel valve to be switched between a first position and a second position, wherein the straight travel valve is switched to the first position such that the working oil discharged from the first hydraulic pump is supplied to the first travel motor and the working oil discharged from the second hydraulic pump discharged from the second hydraulic pump is supplied to the second travel motor, and the straight travel valve is switched to the second position such that the working oil discharged from the first hydraulic pump is supplied to the first and second travel motors and the working oil discharged from the second hydraulic pump is supplied to the actuator, first and second travel motor control valves configured to control amounts of the working oil supplied to the first and second travel motors according to an displacement amount of a spool therein respectively, first and second spool displacement adjusting valves supplying pilot signal pressures to the spools of the first and second travel motor control valves respectively in proportion to an inputted control signal to control the displacement amounts of the spools of the first and second control valves, and a controller configured to output the control signal to each of the first and second spool displacement adjusting valves corresponding to a manipulation signal of an operator, and configured to adjust the displacement amounts of the spools of the first and second control valves to be limited according to a manipulation signal of the actuator when the manipulation signal of the actuator is received during a travelling operation of the first and second travel motors.

In example embodiments, the controller may adjust change rates of the spool displacement amounts of the first and second travel motor control valves according to a change rate of the manipulation signal of the actuator.

In example embodiments, reduction rates of the spool displacement amounts of the first and second travel motor control valves may be increased as the change rate of the manipulation signal of the actuator is increased.

In example embodiments, the spool displacement amounts of the first and second travel motor control valves may have a first maximum spool displacement amount during the single travelling operation of the first and second travel motors, and the spool displacement amounts of the first and second travel motor control valves may have a second maximum spool displacement amount less than the first maximum spool displacement amount when the manipulation signal of e actuator is received during the travelling operation of the first and second travel motors.

In example embodiments, the first and second spool displacement adjusting valves may include an electro proportional pressure reducing valve (EPPRV).

In example embodiments, the controller may include a calculator calculating the amounts of the working oil to be supplied to the first and second travel motors from an inputted travel manipulation signal for the first and second travel motors and the inputted manipulation signal of the actuator, a pedal displacement converter converting an inputted pedal displacement amount for the first and second motors into a secondary pedal displacement amount corresponding to the calculated working oil amount, and an output portion outputting the control signal for controlling the pilot signal pressure in proportion to the secondary pedal displacement amount.

In example embodiments, the actuator may include at least one of a boom cylinder, an arm cylinder and a bucket cylinder.

According to example embodiments, in a travel control method for construction machinery, a hydraulic system including a first travel motor operable by a working oil discharged from a first hydraulic pump, a second travel motor operable by the working oil discharged from the first hydraulic pump or a second hydraulic pump, at least one actuator operable by the working oil discharged from the first hydraulic pump or the second hydraulic pump and first and second travel motor control valves configured to control operations of the first and second travel motors is provided.

A travel manipulation signal of the first and second travel motors is received to supply the working oil discharged from the first hydraulic pump to the first travel motor and the working oil discharged from the second hydraulic pump to the second travel motor, thereby performing a travelling operation of the first and second travel motors. A manipulation signal of the actuator is received during the travelling operation of the first and second travel motors to supply the working oil discharged from the first hydraulic pump to the first and second travel motors and the working oil discharged from the second hydraulic pump to the actuator. Spool displacement amounts of the first and second travel motor control valves are adjusted according to the manipulation signal of the actuator.

In example embodiments, adjusting the spool displacement amounts of the first and second travel motor control valves may include adjusting the spool displacement amounts of the first and second travel motor control valves to be limited according to the manipulation signal of the actuator.

In example embodiments, adjusting the spool displacement amounts of the first and second travel motor control valves may include adjusting the spool displacement amounts of the first and second travel motor control valves to have a first maximum spool displacement amount during the travelling operation of the first and second travel motors, adjusting the spool displacement amounts of the first and second travel motor control valves to have a second maximum spool displacement amount less than the first maximum spool displacement amount when the manipulation signal of the actuator is received during the travelling operation of the first and second travel motors.

In example embodiments, adjusting the spool displacement amounts of the first and second travel motor control valves may include calculating the amounts of the working oil to be supplied to the first and second travel motors from the inputted travel manipulation signal for the first and second travel motors and the inputted manipulation amount for the actuator, converting the inputted pedal displacement amount for the first and second motors into a secondary pedal displacement amount corresponding to the calculated working oil amount, and adjusting the spool displacement amounts of the first and second travel motor control valves according to the secondary pedal displacement amount.

In example embodiments, adjusting the spool displacement amounts of the first and second travel motor control valves according to the secondary pedal displacement amount may include supplying pilot signal pressures to the spools of the first and second travel motor control valves using an electro proportional pressure reducing valve (EP-PRV).

In example embodiments, the actuator may include at least one of a boom cylinder, an arm cylinder and a bucket cylinder.

According to example embodiments, a travel control system for construction machinery may control spool displacement amounts and change rates of first and second travel motor control valves according to a load of an actuator of a front working device when a front working operation is performed during a travelling operation, to thereby reduce switching impact of a straight travel valve and improve fuel efficiency.

Accordingly, an orifice area of an orifice which compensates insufficient flow rate or bypasses excessive flow rate while first and second hydraulic pumps operate may be designed to have the maximum area based on a low operating pressure of the working device to thereby reduce the switching impact of the straight travel valve and pressure loss and improve the fuel efficiency pressure, and the displacement amount of a travel spool may be limited in case of an operation having a relatively high operating pressure (for example, boom up operation) to thereby increase a reaction velocity.

BRIEF DESCRIPTION OF THE DRAWINGS

Example embodiments will be more clearly understood from the following detailed description taken in conjunction with the accompanying drawings.

FIGS. 6 and 7 are graphs illustrating a spool displacement control of a travel motor control valve when a boom up manipulation signal is inputted during a travelling operation in accordance with example embodiments.

FIG. 8 is a flow chart illustrating a travel control method for construction machinery in accordance with example embodiments.

DETAILED DESCRIPTION OF EXAMPLE EMBODIMENTS

Figure 1:
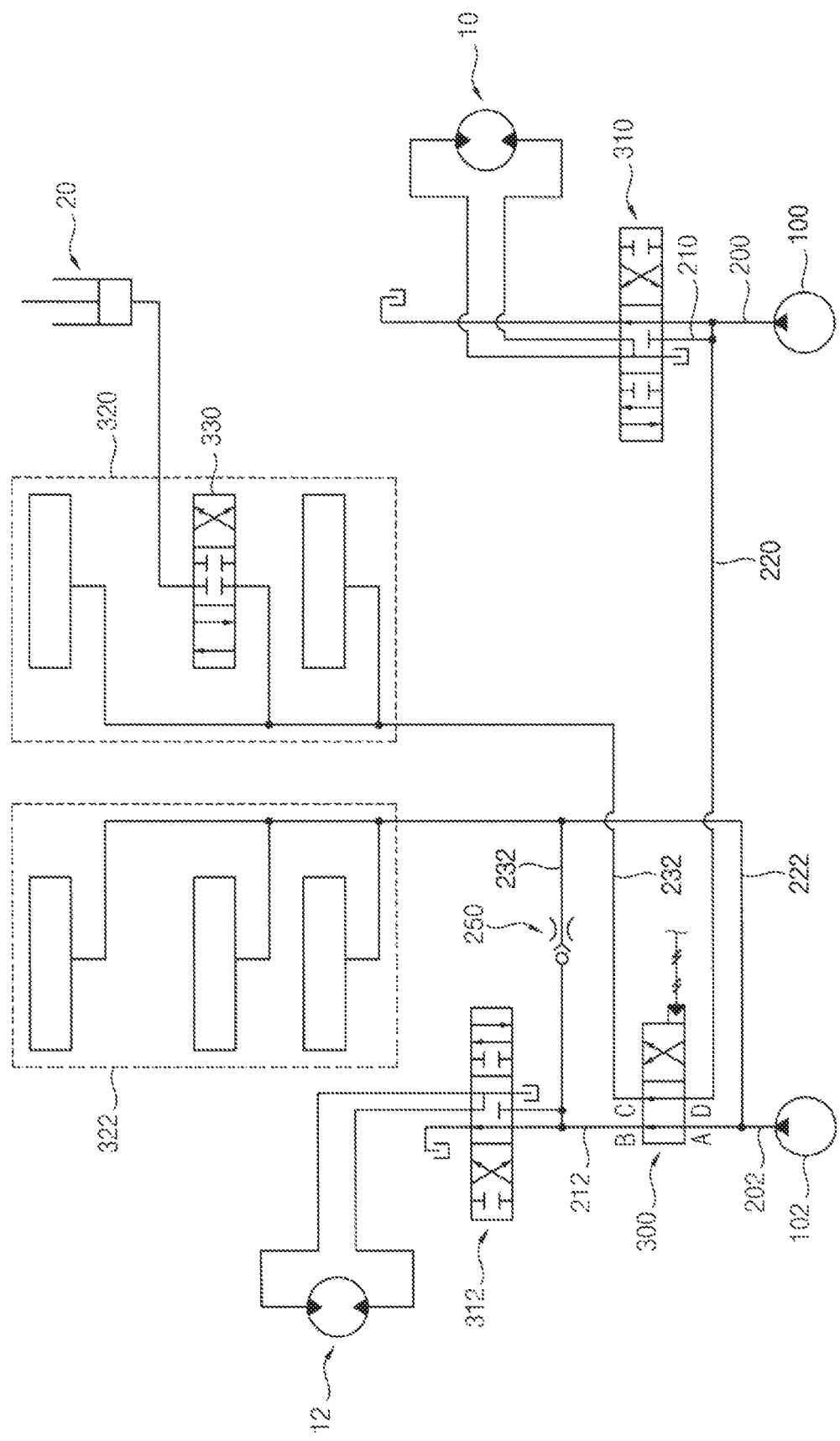
FIGS. 1 and 2 are hydraulic circuit diagrams illustrating a hydraulic system of construction machinery in accordance with example embodiments.

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
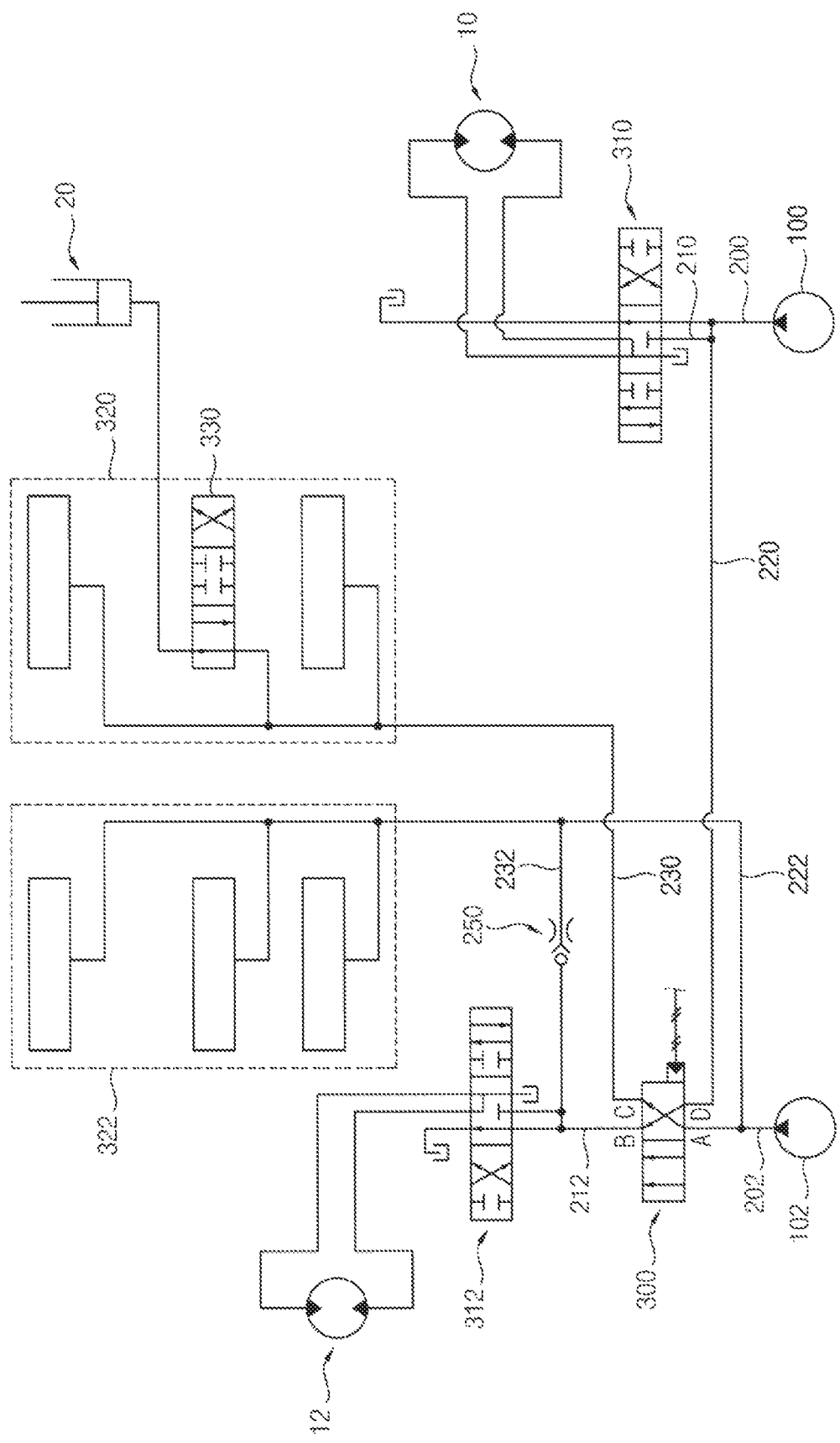
Figure 3:
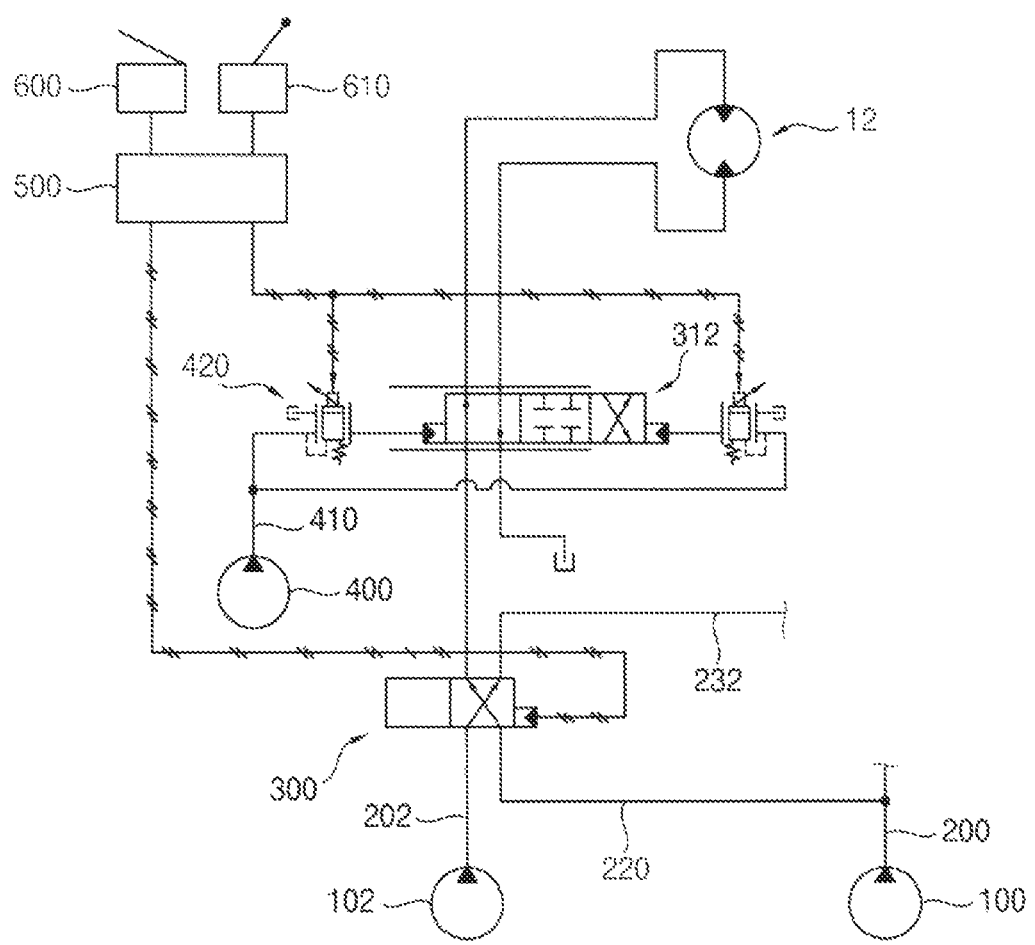
FIG. 3 is a view illustrating a travel control system for controlling the hydraulic system of construction machinery in FIG. 1.
Figure 4:
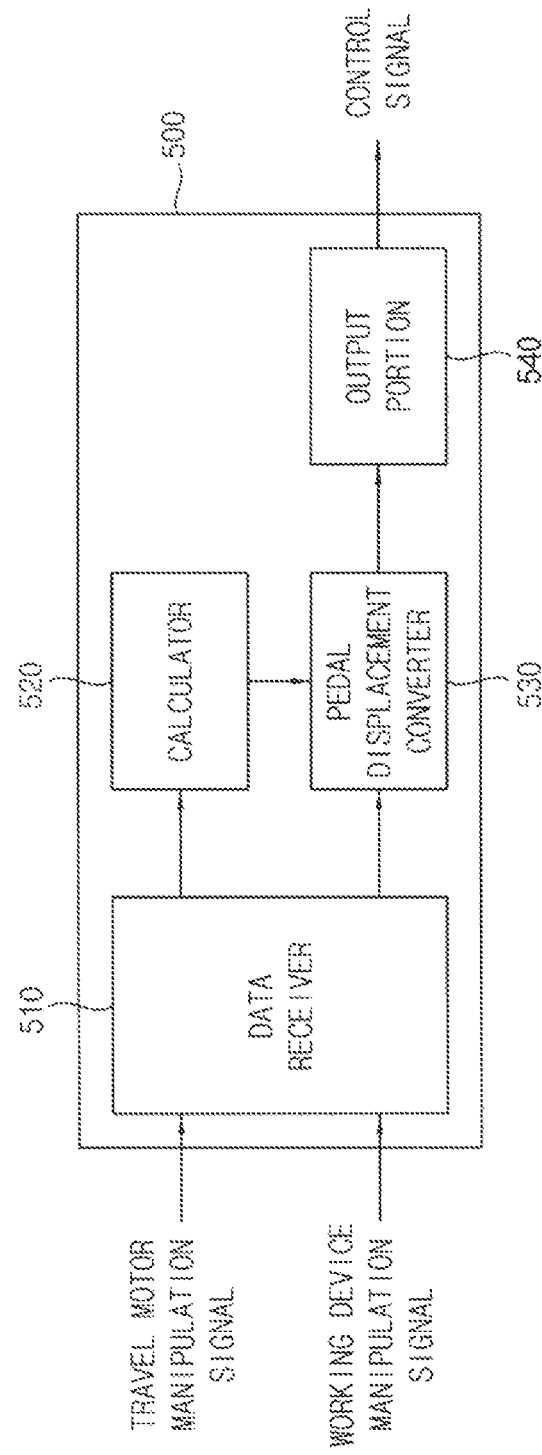
FIG. 4 is a block diagram illustrating a controller of the travel control system in FIG. 3.
Figure 5:
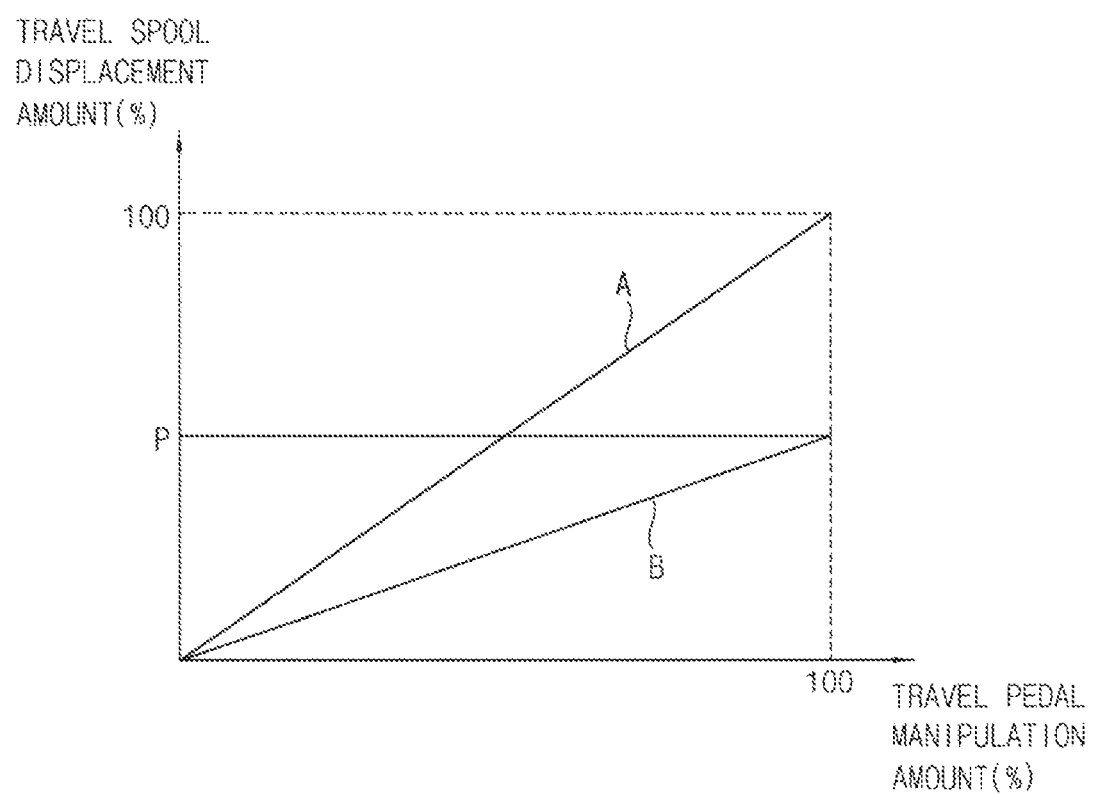
FIG. 5 is graphs illustrating a travel spool displacement amount versus a travel pedal manipulation amount in FIGS. 1 and 2.

FIGS. 1 and 2 are hydraulic circuit diagrams illustrating a hydraulic system of construction machinery in accordance with example embodiments. FIG. 3 is a view illustrating a travel control system for controlling the hydraulic system of construction machinery in FIG. 1. FIG. 4 is a block diagram illustrating a controller of the travel control system in FIG. 3. FIG. 5 is graphs illustrating a travel spool displacement amount versus a travel pedal manipulation amount in FIGS. 1 and 2. FIGS. 6 and 7 are graphs illustrating a spool displacement control of a travel motor control valve when a boom up manipulation signal is inputted during a travelling operation in accordance with example embodiments.

Referring to FIGS. 1 to 7, a travel control system for construction machinery may include a first hydraulic pump 100, a second hydraulic pump 102, a first travel motor 10 operable by a working oil discharged from the first hydraulic pump 100, a second travel motor 12 operable by the working oil discharged from the first hydraulic pump 100 or the second hydraulic pump 102, at least one actuator 20 operable by the working oil discharged from the first hydraulic pump or the second hydraulic pump, a straight travel valve 300 installed between the first and second hydraulic pumps 100, 102 and the first and second travel motors 10, 12 and between the first and second hydraulic pumps 100, 102 and the actuator 20 and configured to control flow directions of the working oil supplied from the first and second hydraulic pumps 100, 102 to the first and second travel motors 10, 12 and the actuator 20, first and second travel motor control valves 310 and 312 configured to control amounts of the working oil supplied to the first and second travel motors 10, 12 according to an displacement amount of a spool therein respectively, a first spool displacement adjusting valve and a second spool displacement adjusting valve 420 supplying pilot signal pressures to the spools of the first and second travel motor control valves 310 and 312 respectively in proportion to an inputted control signal to control the displacement amounts of the spools of the first and second control valves 310 and 320, and a controller 500 configured to output the control signal to each of the first and second spool displacement adjusting valves corresponding to a manipulation signal of an operator to control operations of the first and second travel motors 10, 12.

In example embodiments, the construction machinery may include an excavator, a wheel loader, a forklift, etc. Hereinafter, it will be explained that example embodiments may be applied to the excavator. However, it may not be limited thereto, and it may be understood that example embodiments may be applied to other construction machinery such as the wheel loader, the forklift, etc.

The construction machinery may include a lower travelling body, an upper swinging body mounted to be capable of swinging on the lower travelling body, and a cabin and a front working device installed in the upper swinging body. For example, the excavator may be a crawler-type excavator. The lower travelling body may include a right track and a left track. The first and second travel motors 10, 12 may drive the right track and the left track respectively.

The front working device may include a boom, an arm and a bucket. A boom cylinder for controlling a movement of the boom may be installed between the boom and the upper swinging body. An arm cylinder for controlling a movement of the arm may be installed between the arm and the boom. A bucket cylinder for controlling a movement of the bucket may be installed between the bucket and the arm. As the boom cylinder, the arm cylinder and the bucket cylinder may expand or contract, the boom, the arm and the bucket may implement various movements, to thereby perform various works.

For example, the travel control system for construction machinery may include a first control valve group 320 for controlling a first actuator group and a second control valve group 322 for controlling a second actuator group. The first actuator group may include a second arm cylinder, a first boom cylinder 20 and a bucket cylinder. The second actuator group may include a first arm cylinder, a second arm cylinder and a swing motor.

In example embodiments, the first and second hydraulic pumps 100, 102 may be connected to an engine (not illustrated) through a power transmission device. A power of the engine may be transferred to the first and second hydraulic pumps 100, 102. The working oil discharged from the first and second hydraulic pumps 100, 102 may be supplied to the first and second travel motors 10, 12 through the first and second travel motor control valves 310, 312 respectively and may be supplied to the actuator 20 through the working device control valve 330.

In particular, a first parallel line 210 and a second parallel line 220 may branch off from a first main hydraulic line 200 connected to the first hydraulic pump 100. A third parallel line 222 may branch off from a second main hydraulic line 202 connected to the second hydraulic line 102.

The first travel motor control valve 310 may be connected to the first hydraulic pump 100 through the first parallel line 210. The second travel motor control valve 312 may be connected to the first hydraulic pump 100 or the second hydraulic pump 102 through a first supply line 212 via the straight travel valve 300. The first control valve group 320 may be connected to the straight travel valve 300 through a second supply line 230, and the second control valve group 322 may be connected to the second hydraulic pump 102 through the third parallel valve 222.

A position of a spool of the straight travel valve 300 may be determined by an inputted control signal, for example, an applied current. As the spool of the straight travel valve 300 moves, the flow directions of the working oil supplied from the first and second hydraulic pumps 100, 102 may be changed. For example, the straight travel valve 300 may be 2 position 4 port valve. A first port (A) may be connected to the second hydraulic pump 102, a second portion (B) may be connected to the second travel motor control valve 312, a fourth port (D) may be connected to the first hydraulic pump 100, and a third port (C) may be connected to the first control valve group 320.

As illustrated in FIG. 1, when the straight travel valve 300 is in the first position, a first pathway from the first port (A) to the second port (B) may be formed and a second pathway from the port (D) to the third portion (C) may be formed. Accordingly, the working oil discharged from the first hydraulic pump 100 may be supplied to the first travel motor 10 and the first actuator group, and the working oil discharged from the second hydraulic pump 102 may be supplied to the second travel motor 12 and the second actuator group.

As illustrated in FIG. 2, when the straight travel valve 300 is in the second position, a third pathway from the first port (A) to the third port (C) may be formed and a fourth pathway from the fourth port (D) to the second portion (B) may be formed. Accordingly, the working oil discharged from the first hydraulic pump 100 may be supplied to the first travel motor 10 and the second travel motor 12, and the working oil discharged from the second hydraulic pump 102 may be supplied to the first actuator group and the second actuator group.

In example embodiments, an orifice 250 may be installed in a compensation line 232 between the second travel motor valve 312 and the second control valve group 322, and similarly, an orifice (not illustrated) may be installed between the first travel motor valve 310 and the first control valve group 320, to compensate insufficient flow rate or bypass excessive flow rate while the first and second hydraulic pumps 100, 102 operate.

As illustrated in FIG. 3, in example embodiments, a pilot pump 400 may be connected to an output axis of the engine. As the output axis of the engine rotates, the pilot pump 400 may be driven to discharge a pilot working oil. For example, the pilot pump may include a gear pump. In this case, the working oil and the pilot working oil may include substantially the same material.

The pilot working oil discharged from the pilot pump 400 may be supplied to the spool of the second travel motor control valve 312 via the second spool displacement adjusting valve 420. The pilot working oil discharged from the pilot pump 400 may be supplied to the second spool displacement adjusting valve 420 through a control line 410. The second spool displacement adjusting valve 420 may supply the pilot signal pressure to the spool of the second travel motor control valve 312 in proportion to the inputted control signal to control the displacement amount of the spool of the second travel motor control valve 312.

For example, a pair of the second spool displacement adjusting valves 420 may be provided in both sides of the spool of the second travel motor control valve 312. A first pilot signal pressure outputted from the second spool displacement adjusting valve 420 may be supplied selectively to both sides of the spool, to switch the second travel motor control valve 312. The second spool displacement adjusting valve 420 may supply the pilot signal pressure in proportion to the inputted control signal. The movement of the spool of the second travel motor control valve 312 may be controlled by the pilot signal pressure. That is, the movement direction of the spool may be determined by a supply direction of the pilot signal pressure, and the displacement amount of the spool may be determined by the magnitude of the pilot signal pressure.

Although it is not illustrated in the figures, similarly to the second spool displacement adjusting valve 420, the pilot working oil discharged from the pilot pump 400 may be supplied to the spool of the first travel motor control valve 310 via the first spool displacement adjusting valve. The pilot working oil discharged from the pilot pump 400 may be supplied to the first spool displacement adjusting valve through the control line 410. The first spool displacement adjusting valve may supply the pilot signal pressure to the spool of the first travel motor control valve 310 in proportion to the inputted control signal to control the displacement amount of the spool of the first travel motor control valve 310.

A pair of the first spool displacement adjusting valves may be provided in both sides of the spool of the first travel motor control valve 310. A pilot signal pressure outputted from the first spool displacement adjusting valve may be supplied selectively to both sides of the spool, to switch the first travel motor control valve 310. The first spool displacement adjusting valve may supply the pilot signal pressure in proportion to the inputted control signal. The movement of the spool of the first travel motor control valve 310 may be controlled by the pilot signal pressure. That is, the movement direction of the spool may be determined by a supply direction of the pilot signal pressure, and the displacement amount of the spool may be determined by the magnitude of the pilot signal pressure.

In example embodiments, the travel control system for construction machinery may include a main control valve (MCV) as an assembly including the first and second travel motor control valves 310 and 320. The main control valve may be an electro-hydraulic main control valve including an electro proportional pressure reducing valve (EPPRV) which controls a pilot working oil supplied to the spool of the control valve according to an inputted electrical signal. The first and second spool displacement adjusting valves may include an electro proportional pressure reducing valve (EPPRV).

In example embodiments, the controller 500 may receive the manipulation signal in proportion to a manipulation amount of an operator from a manipulation portion, and may output a pressure command signal as the control signal to the first and second spool displacement adjusting valves corresponding to the manipulation signal. The electro proportional pressure reducing valves may output a secondary pressure in proportion to the pressure command signal to the corresponding spools, to control the spools using electrical signals.

The manipulation portion may include a travel pedal 600 for manipulating the first and second travel motors 10, 12 and a joystick 610 for manipulating the working device. Alternatively, the manipulation portion may include a travel lever for manipulating the first and second travel motors and a working manipulation joystick for manipulating the working device.

When an operator manipulates the travel pedal 600 and the joystick 610, a manipulation signal corresponding to the manipulation (that is, a travel motor manipulation signal and a working device manipulation signal) may be generated. The travel pedal 600 and the joystick 610 may include a sensor for detecting a travel pedal manipulation amount and a working device manipulation amount (or angles). The travel pedal 600 and the joystick 610 may output a signal such as a voltage signal or a current signal corresponding to the detected manipulation amount. The controller 500 may receive the manipulation signal and control the main control valve according to the manipulation signal, to operate the first and second travel motors and the actuators.

The controller 500 may receive travel motor manipulation signals for the first and second travel motors 10, 12 and output the control signal to the straight travel valve 300 to switch the straight travel valve 300 to the first position.

The controller 500 may receive travel pedal manipulation amounts for the first and second travel motors 10, 12, and generate and apply a control signal corresponding to the received travel motor manipulation amount, for example, current to the first and second spool displacement adjusting valves. The first and second spool displacement adjusting valves may apply a pilot signal pressure in proportion to the applied current to the spools of the first and second travel motor control valves 310, 312 to move the spools according to the applied pilot signal pressures respectively. Accordingly, the travel pedal manipulation amounts for the first and second travel motor 10, 12 may be converted into spool displacement amounts of the first and second travel motor control valve 310, 312 at a predetermined conversion ratio respectively.

In example embodiments, when the controller 500 receives a manipulation signal for the actuator (working device manipulation signal) during travelling operations of the first and second travel motors, the controller 500 may output the control signal to the straight travel valve 300 to switch the straight travel valve 300 to the second position.

When the controller 500 receives the manipulation signal for the actuator (working device manipulation signal) during the travelling operations of the first and second motors 10, 12, the controller 500 may control to limit the spool displacement amounts of the first and second travel motor control valves 310, 312.

As illustrated in FIG. 4, the controller 500 may include a data receiver 510, a calculator 520, a spool displacement converter 530 and an output portion 540.

The data receiver 510 may receive a manipulation signal of an operator from the manipulation portion. The data receiver 510 may receive a travel pedal manipulation amount as a travel manipulation signal of an operator from the travel pedal 600. The data receiver 510 may receive a joystick manipulation amount as a working device manipulation signal of an operator for the boom, the arm, the bucket, etc., from the joystick 610. For example, data receiver 510 may receive state values in the hydraulic system, for example, pressures of the first and second hydraulic pumps 100, 102 or the pressures of the first and second actuators. For example, the data receiver 510 may receive a discharge pressure of the working oil discharged from the first and second hydraulic pumps 100, 102 from a pressure sensor.

The calculator 520 may determine whether or not the excavator performs a single travelling operation or a multiple operation of a travelling operation and a working operation, from the inputted travel pedal manipulation amount for the first and second travel motors 10, 12 and the inputted joystick manipulation amount for the actuator, and may calculate an amount of the working oil to be supplied to the first and second travel motors 10, 12.

Alternatively, the calculator 520 may determine whether or not the excavator performs a single travelling operation or a multiple operation of a travelling operation and a working operation, from the inputted travel pedal manipulation amount for the first and second travel motors 10, 12 and the pressure of the actuator.

For example, the calculator 520 may determine the amount of the working oil to be supplied to the first and second travel motors 10, 12 as a maximum amount of the working oil when it is determined that the excavator perform a single travelling operation (when only the travel manipulation signal is received), and may calculate the amount of the working oil to be supplied to each of the first and second travel motors 10, 12 in proportion to the joystick manipulation amount when the excavator performs a multiple operation (when the manipulation signal for the actuator is received during the travelling operations of the first and second travel motors 10, 12).

The pedal displacement converter 530 may convert the inputted pedal displacement amount for the first and second motors 10, 12 into a secondary pedal displacement amount corresponding to the calculated working oil amount. The pedal displacement converter 530 may convert the inputted pedal displacement amount for the first and second motors 10, 12 into the secondary pedal displacement amount using a displacement limit map when it is determined that the multiple operation is to be performed. The inputted pedal displacement amount may be converted into the secondary pedal displacement amount at a predetermined ratio corresponding to a distributed working oil amount, which is stored in the displacement limit map.

The output portion 540 may output the control signal for controlling the pilot signal pressure in proportion to the converted (limited) secondary pedal displacement amount. The output portion 540 may generate and apply current in proportion to the converted secondary pedal displacement amount to the second spool displacement adjusting valve 420. The second spool displacement adjusting valve 420 may supply the pilot signal pressure in proportion to the applied current to the spool of the second travel motor control valve 312 to move the spool of the second travel motor control valve 312 corresponding to the supplied pilot signal pressure.

As illustrated in FIG. 5, the inputted travel pedal displacement (manipulation) amount may be converted into the secondary pedal displacement amount at the predetermined ratio which is stored in the displacement limit map, spool displacement amounts of the first and second travel motor control valves 10, 12 may be determined according to the converted secondary pedal displacement amount. When the excavator performs the single travelling operation of the first and second travel motors 10, 12 (Graph A), an inputted travel pedal displacement amount (0~100%) may be mapped into a travel spool displacement amount (0~100%). When the excavator performs a boom up operation during the travelling operation of the first and second travel motors 10, 12 (Graph B), an inputted travel pedal displacement amount (0~100%) may be mapped into a limited travel spool displacement amount (0~P %). A reduction ratio of the travel spool displacement amount with respect to the inputted travel spool displacement amount may be in proportion to the calculated working oil amount. That is, as the calculated amounts of the working oil supplied to the first and second travel motors 10, 12 are decreased, the travel spool displacement amount may be converted to be decreased accordingly.

Accordingly, the spool displacement amounts of the first and second travel motor control valves 310, 312 may have a first maximum spool displacement amount (100%) during the single travelling operation of the first and second travel motors 10, 12, and the spool displacement amounts of the first and second travel motor control valves 310, 312 may have a second maximum spool displacement amount (P %) less than the first maximum spool displacement amount (P %) when the manipulation signal for the actuator (boom up manipulation signal) is received during the travelling operation of the first and second travel motors 10, 12.

In example embodiments, the controller 500 may adjust change rates of the spool displacement amounts of the first and second travel motor control valves 310, 312 according to a change rate of the manipulation signal of the actuator. The controller may control such that reduction rates of the spool displacement amounts of the first and second travel motor control valves 310, 312 are changed in proportion to the change rate of the manipulation signal of the actuator.

As illustrated in FIG. 6, when a sudden boom up manipulation signal is received during a single travelling operation, the spool displacement amounts of the first and second travel motor control valves 310, 312 may be decreased in a relatively rapid reduction rate. As illustrated in FIG. 7, when a boom up mirroring manipulation signal is received during the single travelling operation, the spool displacement amounts of the first and second travel motor control valves 310, 312 may be decreased in a relatively slow reduction rate.

As mentioned above, the travel control system for construction machinery may control the spool displacement amounts and change rates of the first and second travel motor control valves 310, 312 according to a load of the actuator of the front working device when the front working operation is performed during the travelling operation, to thereby reduce switching impact of the straight travel valve 300 and improve fuel efficiency.

Accordingly, an orifice area of the orifice 250 may be designed to have the maximum area based on a low operating pressure of the working device to thereby reduce the switching impact of the straight travel valve 300 and improve the fuel efficiency pressure, and the displacement amount of the travel spool may be limited in case of an operation having a relatively high operating pressure (for example, boom up operation) to thereby increase a reaction velocity.

It may be illustrated that the above embodiments may be applied to the case that the boom up operation is performed during the single travelling operation, however, it may not be limited thereto. For example, example embodiments may be applied to other operations such as an arm or bucket operation, etc.

Hereinafter, a control method for construction machinery using the travel control system in FIGS. 1 and 2 will be explained.

FIG. 8 is a flow chart illustrating a travel control method for construction machinery in accordance with example embodiments.

Referring to FIGS. 1 to 5 and 8, a travel pedal manipulation signal of an operator for first and second travel motors 10, 12 and a joystick manipulation signal of an operator for a working device 20 may be received (S100).

In example embodiments, a travel pedal manipulation amount may be received as the travel motor manipulation signal for the first and second travel motors 10, 12 through a travel pedal 600. A joystick manipulation amount may be received as the manipulation signal for the working device through a joystick 610.

Then, whether or not the manipulation signal for the working device is received during a travelling operation may be determined (S110, S120), in case that only the travel motor manipulation signal is received, spool displacement amounts of first and second travel motor control valves 310, 312 may be calculated according to the pedal manipulation amount (S120), and in case that the working device manipulation signal is received during the travelling operation, the spool displacement amounts of the first and second travel motor control valves 310, 312 may be calculated according to the pedal manipulation amount and the joystick manipulation amount (S122).

Then, a current command value corresponding to the calculated spool displacement amount may be supplied to the first and second travel motor control valves 310, 312 (S130).

In example embodiments, when the travel manipulation signals of the first and second travel motors 10, 12 are received, the straight travel valve 300 may be switched to the first position such that a working oil discharged from the first hydraulic pump 100 is supplied to the first travel motor 10 and a working oil discharged from the second hydraulic pump 102 is supplied to the second travel motor 12, to perform the travelling operations of the first and second travel motors 10, 12.

When the manipulation signal of an actuator, for example, a boom cylinder 20 is received during the travelling operation of the first and second travel motors 10, 12, the straight travel valve 300 maybe switched to the second position such that the working oil discharged from the first hydraulic pump 100 is supplied to the first and second travel motors 10, 12 and the working oil discharged from the second hydraulic pump 102 is supplied to the actuator.

Then, the spool displacement amounts of the first and second travel motor control valves 10, 12 may be adjusted according to the manipulation signal of the actuator. The spool displacement amounts of the first and second travel motor control valves 10, 12 may be adjusted to be limited according to the manipulation signal of the actuator.

For example, the spool displacement amounts of the first and second travel motor control valves 310, 312 may have a first maximum spool displacement amount during the travelling operation of the first and second travel motors 10, 12. The spool displacement amounts of the first and second travel motor control valves 310, 312 may have a second maximum spool displacement amount less than the first maximum spool displacement amount when the manipulation signal for the actuator is received during the travelling operation of the first and second travel motors 10, 12.

In particular, a calculator 520 of a controller 500 may calculate amounts of the working oil to be supplied to the first and second travel motors 10, 12 from the inputted travel manipulation signal for the first and second travel motors 10, 12 and the inputted joystick manipulation amount for the actuator.

A pedal displacement converter 530 of the controller 500 may convert the inputted pedal displacement amount for the first and second motors 10, 12 into a secondary pedal displacement amount corresponding to the calculated working oil amount. The pedal displacement converter 530 may convert the inputted pedal displacement amount for the first and second motors 10, 12 into the secondary pedal displacement amount using a displacement limit map when the manipulation signal is received during the travelling operation of the first and second travel motors 10, 12. The inputted pedal displacement amount may be converted into the secondary pedal displacement amount at a predetermined ratio corresponding to a distributed working oil amount, which is stored in the displacement limit map.

An output portion 540 of the controller 500 may output a control signal for controlling a pilot signal pressure in proportion to the converted (limited) secondary pedal displacement amount. The output portion 540 may generate and apply current in proportion to the converted secondary pedal displacement amount to first and second spool displacement adjusting valves. The first and second spool displacement adjusting valves may supply the pilot signal pressure in proportion to the applied current to the spools of the first and second travel motor control valves 310, 312 to move the spools of the first and second travel motor control valves 310, 312 corresponding to the supplied pilot signal pressure.

When the single travelling operation of the first and second travel motors 10, 12 is performed, an inputted travel pedal displacement amount (0~100%) may be mapped into a travel spool displacement amount (0~100%). When a boom up operation is performed during the travelling operation of the first and second travel motors 10, 12, an inputted travel pedal displacement amount (0~100%) may be mapped into a limited travel spool displacement amount (0~P %). A reduction ratio of the travel spool displacement amount with respect to the inputted travel spool displacement amount may be in proportion to the calculated working oil amount (inputted manipulation signal of the working device). That is, as the calculated amounts of the working oil supplied to the first and second travel motors 10, 12 are decreased, the travel spool displacement amount may be converted to be decreased accordingly.

In example embodiments, change rates of the spool displacement amounts of the first and second travel motor control valves 310, 312 may be adjusted according to a change rate of the manipulation signal of the actuator. Reduction rates of the spool displacement amounts of the first and second travel motor control valves 310, 312 are controlled to be in proportion to the change rate of the manipulation signal of the actuator.

For example, when a sudden boom up manipulation signal is received during a single travelling operation, the spool displacement amounts of the first and second travel motor control valves 310, 312 may be decreased in a relatively high reduction rate. When a boom up mirroring manipulation signal is received during the single travelling operation, the spool displacement amounts of the first and second travel motor control valves 310, 312 may be decreased in a relatively low reduction rate.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A travel control system for construction machinery, comprising:
   first and second hydraulic pumps;
   a first travel motor operable by a working oil discharged from the first hydraulic pump;
   a second travel motor operable by the working oil discharged from the first hydraulic pump or the second hydraulic pump;
   at least one actuator operable by the working oil discharged from the first hydraulic pump or the second hydraulic pump;
   a straight travel valve to be switched between a first position and a second position, wherein the straight travel valve is switched to the first position such that the working oil discharged from the first hydraulic pump is supplied to the first travel motor and the working oil discharged from the second hydraulic pump is supplied to the second travel motor, and the straight travel valve is switched to the second position such that the working oil discharged from the first hydraulic pump is supplied to the first and second travel motors and the working oil discharged from the second hydraulic pump is supplied to the actuator;
   first and second travel motor control valves configured to control amounts of the working oil supplied to the first and second travel motors according to a displacement amount of a spool therein respectively;
   first and second spool displacement adjusting valves supplying pilot signal pressures to the spools of the first and second travel motor control valves respectively in proportion to an inputted control signal to control the displacement amounts of the spools of the first and second travel motor control valves; and
   a controller configured to output the control signal to each of the first and second spool displacement adjusting valves corresponding to a manipulation signal of an operator, and configured to adjust the displacement amounts of the spools of the first and second travel motor control valves to be limited according to a manipulation signal of the actuator when the manipulation signal of the actuator is received during a travelling operation of the first and second travel motors,
   wherein the controller comprises:
      a calculator calculating the amounts of the working oil to be supplied to the first and second travel motors from an inputted travel manipulation signal for the first and second travel motors and the inputted manipulation signal of the actuator;
      a pedal displacement converter converting an inputted pedal displacement amount for the first and second motors into a secondary pedal displacement amount corresponding to the calculated working oil amount; and
      an output portion outputting the control signal for controlling the pilot signal pressure in proportion to the secondary pedal displacement amount.

2. The travel control system for construction machinery of claim 1, wherein the controller adjusts change rates of the spool displacement amounts of the first and second travel motor control valves according to a change rate of the manipulation signal of the actuator.

3. The travel control system for construction machinery of claim 2, wherein reduction rates of the spool displacement amounts of the first and second travel motor control valves are increased as the change rate of the manipulation signal of the actuator is increased.

4. The travel control system for construction machinery of claim 1, wherein the spool displacement amounts of the first and second travel motor control valves have a first maximum spool displacement amount during the single travelling operation of the first and second travel motors, and the spool displacement amounts of the first and second travel motor control valves have a second maximum spool displacement amount less than the first maximum spool displacement amount when the manipulation signal of the actuator is received during the travelling operation of the first and second travel motors.

5. The travel control system for construction machinery of claim 1, wherein the first and second spool displacement adjusting valves include an electro proportional pressure reducing valve (EPPRV).

6. The travel control system for construction machinery of claim 1, wherein the actuator includes at least one of a boom cylinder, an arm cylinder and a bucket cylinder.

7. A travel control method for construction machinery, comprising:
  providing a hydraulic system including a first travel motor operable by a working oil discharged from a first hydraulic pump, a second travel motor operable by the working oil discharged from the first hydraulic pump or a second hydraulic pump, at least one actuator operable by the working oil discharged from the first hydraulic pump or the second hydraulic pump and first and second travel motor control valves configured to control operations of the first and second travel motors;
  receiving a travel manipulation signal of the first and second travel motors to supply the working oil discharged from the first hydraulic pump to the first travel motor and the working oil discharged from the second hydraulic pump to the second travel motor, thereby performing a travelling operation of the first and second travel motors;
  receiving a manipulation signal of the actuator during the travelling operation of the first and second travel motors to supply the working oil discharged from the first hydraulic pump to the first and second travel motors and the working oil discharged from the second hydraulic pump to the actuator; and
  adjusting spool displacement amounts of the first and second travel motor control valves according to the manipulation signal of the actuator,
  wherein adjusting the spool displacement amounts of the first and second travel motor control valves comprises:
    calculating the amounts of the working oil to be supplied to the first and second travel motors from the inputted travel manipulation signal for the first and second travel motors and the inputted manipulation amount for the actuator;
    converting the inputted pedal displacement amount for the first and second motors into a secondary pedal displacement amount corresponding to the calculated working oil amount; and
    adjusting the spool displacement amounts of the first and second travel motor control valves according to the secondary pedal displacement amount.

8. The method of claim 7, wherein adjusting the spool displacement amounts of the first and second travel motor control valves further comprises adjusting the spool displacement amounts of the first and second travel motor control valves to be limited according to the manipulation signal of the actuator.

9. The method of claim 8, wherein adjusting the spool displacement amounts of the first and second travel motor control valves to be limited according to the manipulation signal of the actuator comprises
  adjusting the spool displacement amounts of the first and second travel motor control valves to have a first maximum spool displacement amount during the travelling operation of the first and second travel motors; and
  adjusting the spool displacement amounts of the first and second travel motor control valves to have a second maximum spool displacement amount less than the first maximum spool displacement amount when the manipulation signal of the actuator is received during the travelling operation of the first and second travel motors.

10. The method of claim 7, wherein adjusting the spool displacement amounts of the first and second travel motor control valves according to the secondary pedal displacement amount comprises supplying pilot signal pressures to the spools of the first and second travel motor control valves using an electro proportional pressure reducing valve (EPPRV).

11. The method of claim 7, wherein the actuator includes at east one of a boom cylinder, an arm cylinder and a bucket cylinder.

* * * * *